(12) United States Patent
Sieting et al.

(10) Patent No.: US 10,919,422 B2
(45) Date of Patent: Feb. 16, 2021

(54) VENTILATED SEAT

(71) Applicant: Faurecia Automotive Seating, LLC, Auburn Hills, MI (US)

(72) Inventors: Todd Sieting, Clarkston, MI (US); David C Hart, Macomb, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 43 days.

(21) Appl. No.: 16/287,472

(22) Filed: Feb. 27, 2019

(65) Prior Publication Data

US 2020/0269736 A1      Aug. 27, 2020

(51) Int. Cl.
   *B60N 2/56*       (2006.01)
   *B60N 2/58*       (2006.01)

(52) U.S. Cl.
   CPC ......... *B60N 2/5642* (2013.01); *B60N 2/5657* (2013.01); *B60N 2/58* (2013.01)

(58) Field of Classification Search
   CPC .................................................. B60N 2/5657
   USPC .............................. 454/120, 907; 297/180.14
   See application file for complete search history.

(56) References Cited

U.S. PATENT DOCUMENTS

| | | | |
|---|---|---|---|
| 6,019,420 A | 2/2000 | Faust | |
| 6,629,724 B2 | 10/2003 | Ekern | |
| 6,722,148 B2 | 4/2004 | Aoki | |
| 6,988,770 B2 | 1/2006 | Witchie | |
| 7,040,710 B2 | 5/2006 | White | |
| 8,585,137 B2 | 11/2013 | Park | |
| 9,789,796 B1 | 10/2017 | White | |
| 10,065,543 B2 | 9/2018 | Persson | |
| 2004/0139754 A1* | 7/2004 | Kamiya | G05D 23/1928 62/186 |
| 2007/0134464 A1* | 6/2007 | Schindzielorz | B32B 5/26 428/86 |
| 2007/0193279 A1 | 8/2007 | Yoneno | |
| 2015/0069811 A1* | 3/2015 | Sachs | B60N 2/995 297/423.1 |
| 2016/0236598 A1* | 8/2016 | Hoshi | B60N 2/5685 |
| 2017/0043695 A1 | 2/2017 | Kitamoto | |

FOREIGN PATENT DOCUMENTS

| | | |
|---|---|---|
| CN | 201329822 | 10/2009 |
| CN | 203493214 | 3/2014 |
| DE | 102005026541 A1 | 12/2006 |
| DE | 102009038311 A1 | 2/2011 |
| DE | 102013216885 | 2/2015 |
| DE | 102015010661 A1 | 3/2016 |
| DE | 102016124476 A1 | 6/2018 |
| FR | 2630056 | 10/1989 |

OTHER PUBLICATIONS

German Search Report for German App. No. 10 2020 1034 131.4 dated Oct. 2, 2020, IDFAUH18035 DE II, 8 pages.

* cited by examiner

*Primary Examiner* — Vivek K Shirsat
(74) *Attorney, Agent, or Firm* — Barnes & Thornburg LLP

(57) ABSTRACT

An occupant support comprising a vehicle seat that includes a seat back with a seat-back cover arranged to extend around a seat-back cushion and a seat bottom that includes a seat-bottom cover arranged to extend around a seat-bottom cushion. The occupant support further includes a forced air unit configured to provide a pressurized flow of air to at least one of the seat bottom and seat back.

16 Claims, 2 Drawing Sheets

VENTILATED SEAT

BACKGROUND

The present disclosure relates to an occupant support with forced airflow and ventilation.

SUMMARY

According to the present disclosure, an occupant support arrangement is provided for a vehicle. The occupant support includes a seat support base comprising a seat bottom or a seat back, a bight line located between the seat bottom and seat back, and a seat cover encapsulating the seat support base. The seat cover further comprising a membrane and a forced air unit positioned directly above or directly below the bight line.

In illustrative embodiments, a foam material is placed adjacent to the forced air unit such that air flows away from the forced air unit when the forced air unit is active.

In illustrative embodiments, the seat back trim cover or the seat cushion trim cover includes a substantially airtight membrane.

In illustrative embodiments, the forced air unit comprises a fan, a blower, or a combination thereof.

In illustrative embodiments, the foam material comprises open-cell foam that allows air to flow through voids within the open-cell foam and exit the seat cover through at least one ventilation opening.

In illustrative embodiments, the membrane comprises a sewed textile or a plurality of heat-welded layers of material.

In illustrative embodiments, the air flows through the open-cell foam and exits through the seat back trim cover or the seat cushion trim cover through the ventilation opening.

In illustrative embodiments, the airtight membrane is adapted to include a heat mat within the seat trim cover, the heat mat having at least one ventilation opening thereon aligned with the seat trim cover ventilation opening.

In illustrative embodiments, the airtight membrane is adapted to include a heat mat within the seat trim cover, the heat mat having at least one ventilation opening thereon misaligned with the seat trim cover ventilation opening.

In illustrative embodiments, the membrane comprises a three-dimensional mesh arranged to distribute air evenly and move heat when the forced air unit is active.

In illustrative embodiments, the membrane comprises a three-dimensional mesh with soft-knit material, a humidity liner, a humidity wicking material, a pre-determined contour, a reinforcement feature, leather, artificial leather, or any combination thereof.

In illustrative embodiments, the at least one forced air unit is located directly beneath the bight line of the occupant support and upstream of the air flow when the forced air unit is active.

In illustrative embodiments, the at least one forced air unit is placed inside the foam material located in the seat back or seat cushion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
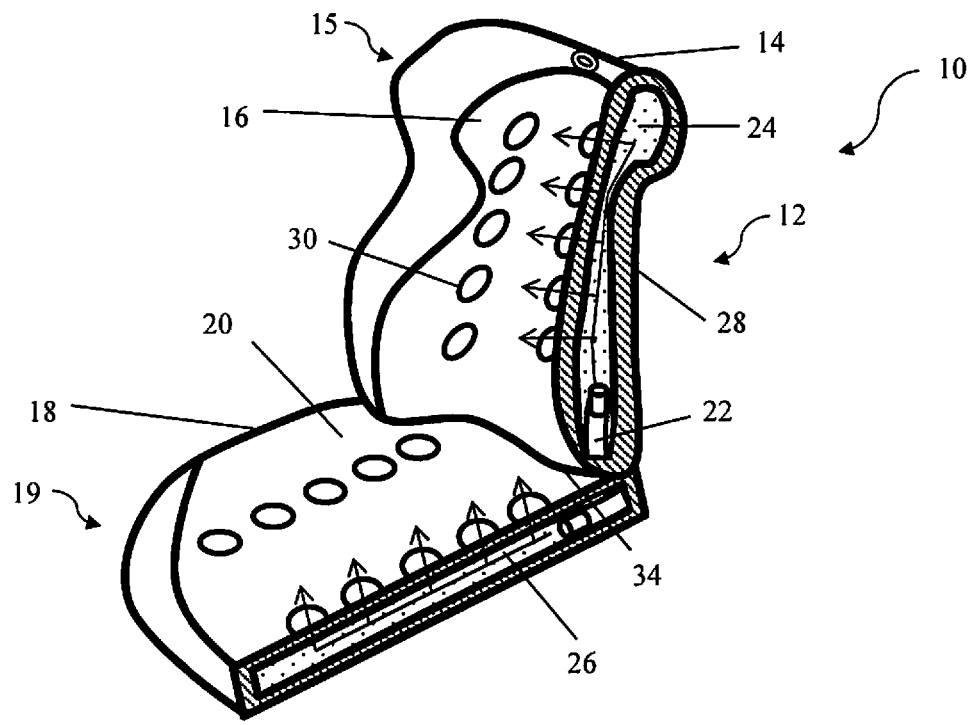
FIG. 1 is a partial perspective view of an occupant support in accordance with the present disclosure.
Figure 2:
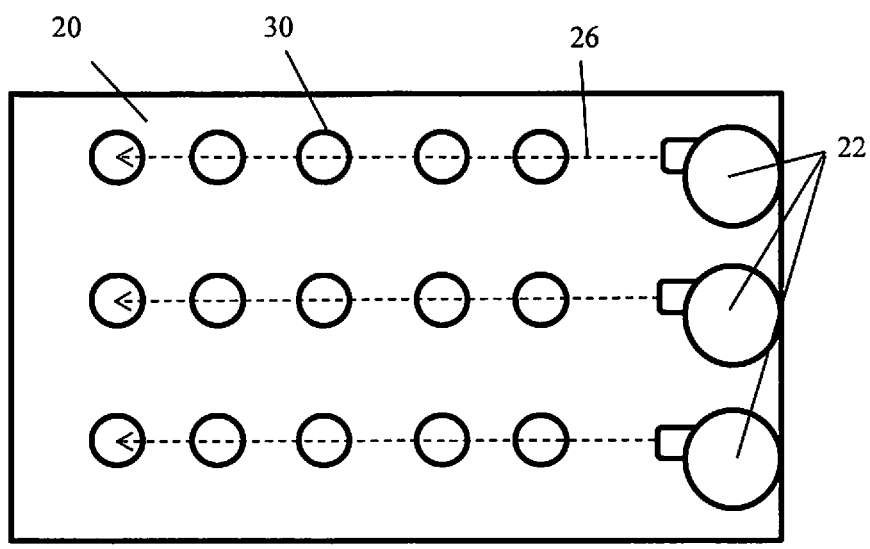
FIG. 2 is a diagrammatic top view of a seat bottom included in the occupant support of FIG. 1 showing that three fans and fifteen ventilation openings of circular shape force air to flow from the fan and out the ventilation openings as suggested by the dashed arrows.

An occupant support 10 includes a vehicle seat 12 and at least one forced air unit 22 as suggested in FIGS. 1 and 2. The forced air unit 22 is coupled to the vehicle seat 12 to force air through the vehicle seat 12 to manage thermal comfort of an occupant resting on vehicle seat 12.

Vehicle seat 12 includes at least one occupant support base. In one example as shown in FIG. 1, vehicle seat 12 includes a first occupant support base embodied as a seat back 14 and a second occupant support base embodied as a seat bottom 18. The seat back 14 is coupled to the seat bottom 18 and is arranged to extend upwardly away from the seat bottom 18. A bight line 34 is located between the seat bottom 18 and the seat back 14 as shown in FIG. 1. One of the occupant support bases may include a membrane 28, which is airtight except for ventilation openings 30 formed there through.

Each occupant support base includes a cushion and a cover arranged to extend around the cushion. As shown in FIG. 1, the occupant support base embodied as a seat back 14 includes a seat back cushion 15 and a seat back cover 16 arranged to extend around the seat back cushion 15. The occupant support base embodied as the seat bottom 18 includes a seat bottom cushion 19 and seat bottom cover 20 arranged to extend around the seat bottom cushion. Each cover defines a cover space that houses the support base components therein.

In one example, a forced air unit 22 is located in the cover of each occupant support base. In another example, a forced air unit 22 is located in the cover of one occupant support base and is configured to provide forced air to both occupant support bases. The forced air unit 22 may be any suitable device, including a fan, a blower, or a combination thereof to move air from one location to another within the seat bottom 18 or seat back 14.

Figure 3:
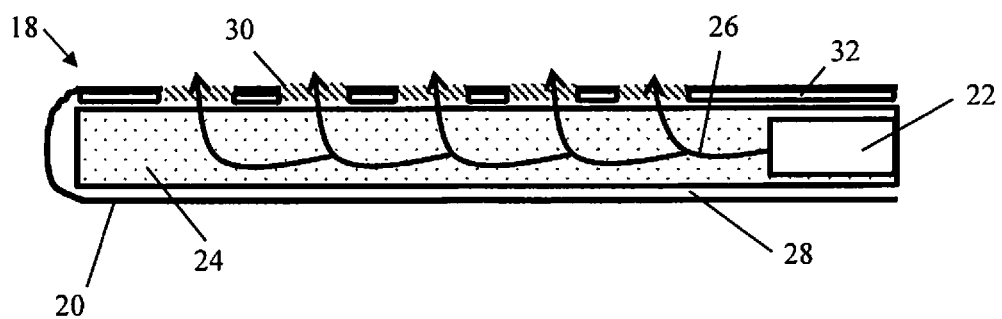
FIG. 3 is a diagrammatic side elevation view of the seat bottom of FIGS. 1 and 2.

The cover of the occupant support base is arranged to extend around and on the cushion, and may be further arranged to extend around a foam material 24. In one example, the foam material is open cell foam as suggested in FIG. 1. The materials commonly used for automotive applications are open cell foam, closed cell foam, melamine foam, natural fibers, fabrics, and/or adhesives. The varieties of foam, without limitation, include polyethylene, polycarbonate, polyamide, polypropylene, combinations thereof, and any other suitable alternatives. Proprietary formulations of foam may also be integrated into the present disclosure as the foam material 24. The foam material 24 is placed adjacent to the at least one forced air unit 22 such that air flow 26 moves away from the forced air unit 22 when the at least one forced air unit 22 is active as shown in FIGS. 1 and 3.

The cover includes, for example, a membrane 28, as shown in FIG. 1. The foam material 24 may be open-cell foam that allows air to flow through voids formed in the foam. The membrane 28 may be airtight except for ventilation openings formed there through. The membrane 28 may include a number of suitable materials, including but not limited to, a sewed textile or a plurality of coupled layers of material. Although the membrane 28 may be airtight, the location of each ventilation opening allows air to pass through from the interior of the seat bottom 18 to the exterior of the seat bottom 18. Likewise for the seat back 14, the air is permitted to flow from the interior of the seat back 14 through the ventilation openings to allow air to pass therefrom.

In one example, fifteen ventilation openings may be used. However, in another example, the number of ventilation openings may vary as needed between one and 100 openings. Any specific number of ventilation openings in the range of two to 100 may be used.

The forced air unit 22 provides an air flow 26 as suggested in FIG. 2. The air flow 26 moves through the foam material 24, for example through open-cell foam, and exits through at least one ventilation opening 30 formed in the cover. A heat mat may be included as part of membrane 28, for example, to have ventilation openings 30 formed there through. Heat mat 32, as shown in FIG. 3, may be integrated as part of the membrane at 28 with ventilation openings 30. This will provide a heated flow of air to the occupant at the seat bottom 18 or seat back 14.

The seat back cover 16 or seat bottom cover 20 may include a mesh material, in which a three-dimensional mesh is arranged to distribute air evenly and move heat when the forced air unit 22 is active. The B-face of the cover material may include a three-dimensional mesh having a soft-knit material, a humidity liner, a humidity wicking material, a pre-determined contour, a reinforcement feature, leather, artificial leather, or any combination thereof.

The forced air unit 22 moves air along the lengthwise longitudinal direction away from the forced air unit 22, the forced air unit 22 being located in at least one of the seat back or the seat cushion when the forced air unit is active. This will cause the air flow 26 located in the seat bottom 18 to move away from the bight line 34 and away from the seat back 14. In one example when the occupant-support base is embodied as a seat bottom 18, the forced air unit 22 is located directly beneath the bight line 34. The foam material 24 may be formed to include a space and the forced air unit 22 may be located in the space of the foam material 24.

Similarly, the air flow 26 located in the seat back 14 will move away from the bight line 34 and away from the seat bottom 18. The at least one forced air unit 22 is located directly above the bight line 34 of the vehicle seat 12 in the seat back 14. The at least one forced air unit 22 is placed inside the foam material 24 located in the seat back 14.

An occupant may desire ventilation of the vehicle seat 12 while experiencing relatively high temperature or humidity. The present disclosure provides venting of an occupant support, for example a vehicle seat, with integrated fans or blowers. This improves air flow in a smaller design space within the seat overall. To place small fans or blowers in close proximity to the seat surface at the seat cushion and/or seat back may reduce energy consumption and improve efficiency of the ventilation system. Such improved packaging allows venting to be possible in aftermarket seat covers as well.

A sack or carrier section may be defined between the foam material and the trim cover. The sack or carrier section forms a membrane by sewing or welding two layers of airtight material. The sides facing the occupant may include other climate control elements, such as heat mats with openings in them, so that added features may be included.

A three-dimensional mesh may be installed to keep the bag from collapsing, promote even air distribution, and provide some cushion for comfort. Fans may be embedded in the foam and/or three-dimensional mesh to provide air flow through the length of the mesh.

The invention claimed is:

1. An air mover arrangement within an occupant support comprising:
   a seat support base comprising a seat bottom or a seat back, the seat bottom or seat back formed to include a space therein;
   a bight line located between the seat bottom and seat back;
   a seat cover encapsulating the seat bottom or the seat back and comprising a membrane; and
   a forced air unit arranged within the space and positioned directly above and adjacent to or directly below and adjacent to the bight line,
   wherein the seat cover on the seat back or the seat cushion includes at least one ventilation opening, and
   wherein the seat cover is adapted to include a heat mat within the seat cover, the heat mat having a plurality of heat mat ventilation openings thereon that each define a heat mat ventilation opening width that corresponds to a ventilation opening width of a corresponding ventilation opening of the at least one ventilation opening.

2. The air mover arrangement of claim 1, further comprising a foam material arranged within the space and adjacent to the forced air unit such that air forced by the forced air unit flows away from the forced air unit when the forced air unit is active wherein an entirety of the air forced by the forced air unit flows from the forced air unit and immediately into the foam material.

3. The air mover arrangement of claim 1, wherein the seat cover on the seat back or the seat cushion includes an airtight membrane.

4. The air mover arrangement of claim 1, wherein the forced air unit comprises a fan, a blower, or a combination thereof.

5. The air mover arrangement of claim 2, wherein the foam material comprises open-cell foam that allows air to flow through voids within the open-cell foam and exit the seat cover through at least one ventilation opening.

6. The air mover arrangement of claim 3, wherein the airtight membrane comprises a sewed textile.

7. The air mover arrangement of claim 5, wherein the air flows through the open-cell foam and exits through the seat cover through the at least one ventilation opening.

8. The air mover arrangement of claim 6, wherein the airtight membrane is adapted to include the heat mat within the seat cover, the heat mat having at least one heat mat ventilation opening thereon aligned with the at least one ventilation opening.

9. The air mover arrangement of claim 6, wherein the airtight membrane is adapted to include the heat mat within the seat cover, the heat mat having at least one heat mat ventilation opening thereon misaligned with the at least one ventilation opening.

10. The air mover arrangement of claim 6, wherein the airtight membrane comprises a three-dimensional mesh arranged to distribute air evenly and move heat when the forced air unit is active.

11. The air mover arrangement of claim 6, wherein the airtight membrane comprises a three-dimensional mesh, a soft-knit material, a humidity liner, a humidity wicking material, a pre-determined contour, a reinforcement feature, leather, artificial leather, or any combination thereof.

12. The air mover arrangement of claim 6, wherein the forced air unit is located directly beneath the bight line and upstream of the air flow when the forced air unit is active.

13. The air mover arrangement of claim 3, wherein the airtight membrane comprises a plurality of heat-welded layers of material.

14. An air mover arrangement within an occupant support, the air mover arrangement comprising:
   a seat support base comprising a seat bottom or a seat back;
   a bight line located between the seat bottom and seat back;
   a seat cover encapsulating the seat bottom or the seat back and comprising a membrane; and
   a forced air unit positioned directly above and adjacent to or directly below and adjacent to the bight line,
   wherein the seat cover on the seat back or the seat cushion includes at least one ventilation opening, and
   wherein the seat cover is adapted to include a heat mat within the seat cover, the heat mat having a plurality of heat mat ventilation openings thereon that each define a heat mat ventilation opening width that equals a ventilation opening width of a corresponding ventilation opening of the at least one ventilation opening.

15. The air mover arrangement of claim 10, wherein the three-dimensional mesh is arranged in the membrane in order to prevent collapse of the cover.

16. An air mover arrangement within an occupant support comprising:
   a seat support base comprising a seat bottom or a seat back, the seat bottom or seat back including foam therein;
   a bight line located between the seat bottom and seat back;
   a seat cover encapsulating the seat bottom or the seat back and comprising a membrane; and
   a forced air unit positioned directly above or directly below the bight line such that an entirety of an air flow generated by the forced air unit flows away from the bight line and through the foam material when the forced air unit is active,
   wherein the air flow in the seat bottom initially flows longitudinally lengthwise through the foam material of the seat bottom and subsequently vertically through the foam material and outward of the seat bottom, or the air flow in the seat back initially flows vertically lengthwise through the foam material of the seat back and subsequently longitudinally through the foam material and outward of the seat back,
   wherein the seat cover on the seat back or the seat cushion includes at least one ventilation opening, and
   wherein the seat cover is adapted to include a heat mat within the seat cover, the heat mat having a plurality of heat mat ventilation openings thereon that each define a heat mat ventilation opening width that corresponds to a ventilation opening width of a corresponding ventilation opening of the at least one ventilation opening.

* * * * *